United States Patent Office 3,290,271
Patented Dec. 6, 1966

3,290,271
NAPHTHYL CONDENSED NOVOLAK
John O'Brochta, Pittsburgh, Pa., assignor to Koppers
Company, Inc., a corporation of Delaware
No Drawing. Filed Apr. 1, 1963, Ser. No. 269,802
3 Claims. (Cl. 260—59)

This invention relates generally to novolak resins.

Novolak resins are widely used for moldings and castings and in the manufacture of coatings, adhesives, and the like. The resins are permanently thermoplastic until such time as they are cured, for example, by hexamethylene tetraamine and the like. The novolak resins are made by the condensation of a phenol with an aldehyde in an acid medium and are usually chains connected by a methylene bridge.

There has now been discovered, in accordance with this invention, a novel resin of the novolak type wherein a naphthyl group is included in the methylene chain. The novel resin is made by the condensation of a novolak resin with chloromethyl naphthalene. The condensation is readily carried out at elevated temperatures in the presence of a Friedel-Crafts catalyst such as zinc chloride. The condensation of a novolak resin with a 1'-chloro-1-methylnaphthalene results in the naphthyl terminating the resin as:

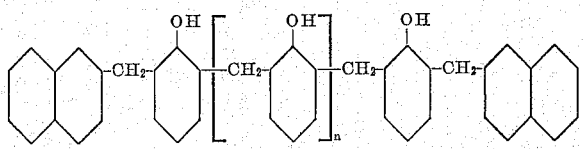

The condensation of the novolak resin with di-(ω-chloromethyl)-naphthalene intersperses the naphthyl group in the methylene chain as

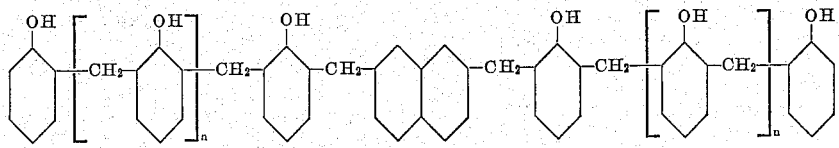

In both cases, $n=1$ to 8.

The novolak resin for use in this invention may be prepared by any of the well-known procedures for carrying out phenol-aldehyde condensations. Ordinarily the phenol and the aldehyde are condensed by reacting them together in the presence of an acidic condensation catalyst until the products have become relatively viscous. Solvents may be employed. Elevated temperatures naturally accelerate the rate of reaction.

Advantageously, the novolak resin is prepared from phenols having only two aldehyde-reactive positions available for condensation with an aldehyde as this generally assures the thermoplastic nature of the resin since there is little possibility of cross-linking condensations which might cause premature thermosetting.

Such phenols have the general formula:

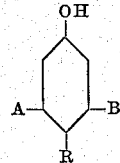

where

A and B may be hydrogen, an alkyl group or a hydroxyl group
R is a hydrocarbon group such as alkyl, aryl, aralkyl, alkaryl cycloalkyl, etc.

Such phenols include o- and p-cresols, o- and p-ethyl phenols, o- and p-isopropyl phenols, o- and p-tert-butyl phenols, o- and p-sec-butyl phenols, o- and p-amyl phenols, o- and p-octyl phenols, o- and p-nonyl phenols etc., 2,5-xylenol, 3,4-xylenol, 2,5-diethyl phenol, 3,4-diethyl xylenol, 2,5-diisopropyl phenol, 4-methyl resorcinol, 4-ethyl resorcinol, 4-isopropyl resorcinol 4-tert-butyl resorcinol, etc., o- and p-benzyl phenol, o- and p-phenethyl phenols, o- and p-phenyl phenols, o- and p-tolyl phenols, o- and p-xylyl phenols, o- and p-cyclohexyl phenols, o- and p-cyclopentyl phenols, etc., 4-phenethyl resorcinol, 4-tolyl-resorcinol, 4-cyclohexyl resorcinol, etc.

Any aldehyde may be used which will condense with the particular phenol being used. Suitable aldehydes include formaldehyde, acetaldehyde, propionaldehyde, butyraldehyde, heptaldehyde, benzaldehyde, furfuraldehyde, glyoxal, etc., or compounds capable of engendering aldehydes such as para-formaldehyde, hexamethylene tetraamine, etc. The aldehydes can also be used in the form of a solution, such as the commercially available formalin.

To give dispersible resins, greater than 0.5 mole or 50 mole percent of aldehyde is provided per mole of phenol. Theoretically, in order to have complete conversion to resinous products, at least about 67 mole percent of aldehyde should be combined with one mole of phenol. In actual practice, however, it is necessary to use at least about 75–80 percent of aldehyde since some aldehyde is lost during the reaction, the amount lost depending on the conditions of the reaction. For example, the use of 60 mole percent aldehyde usually gives only about 50 mole percent combined aldehyde, thus giving a non-resinous product of the bis-phenol type. However, if excess is used so that 60 mole percent of the aldehyde is combined with the phenol the product is a mixture of resin and bis-phenol compound. When amounts larger

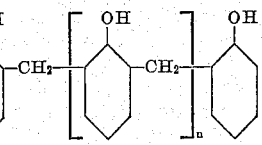

than about 67 mole percent up to a theoretical mole percent of 100 are combined, higher molecular weight polymers result.

The novolak resin resulting from the foregoing comprises a series of phenyl groups connected by methylene bridges. Thus, when three moles of para-cresol and two moles of formaldehyde are combined the condensation product has a structure predominantly:

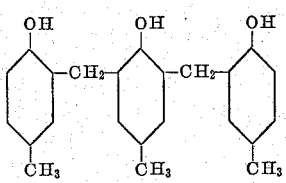

With a ratio of six moles of para-cresol and five moles of combined formaldehyde, the product is predominantly:

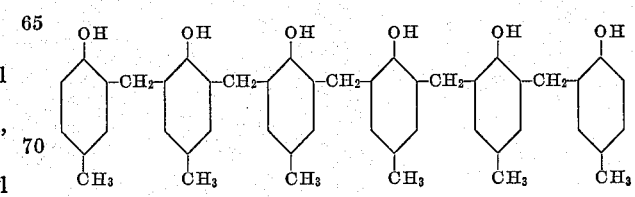

The chloromethyl naphthalene may be 1'-chloro-1-methylnaphthalene having the formula:

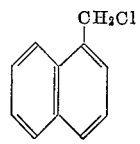

or di-(ω-chloromethyl)-naphthalene having the formula:

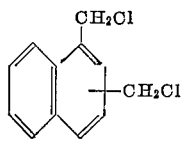

Such naphthalene can readily be made in accordance with the procedures described in United States Patent Nos. 1,910,462 and 1,910,475. Briefly, this involves a reaction of naphthalene, formaldehyde and hydrogen chloride.

The proportions of the chloromethyl naphthalene and novolak may range from molar proportions; i.e., one mole of monochloromethyl naphthalene per mole of novolak resin and one mole of di-(ω-chloromethyl)-naphthalene per two moles of novolak resin, to one mole of chloromethyl naphthalene per phenyl group of the novolak resin.

The invention will be illustrated further by the following examples:

EXAMPLE I

Novolak

A one liter resin flask was charged with 324 grams o-cresol, 200 grams of 45% aqueous formaldehyde and 3 grams oxalic acid dihydrate. The mix was heated with stirring at such a rate that 90 minutes were required to attain refluxing conditions (98–101° C.). Refluxing was then continued for 2 hours. Thereafter, the water and unreacted o-cresol were removed by distillation at atmospheric pressure to a temperature of 145° C. and then at 25 mm. mercury absolute to a final stripping temperature of 150° C. There was obtained 350 grams of a pale resin having a softening point of 99° C. (R. and B.).

1'-chloro-1-methyl naphthalene

A charge of 768 grams of pulverized naphthalene is mixed with 750 grams of an aqueous solution of formaldehyde (30 percent strength) and 3000 grams of concentrated hydrochloric acid. The mixture is heated to between 60° and 70° C. with agitation and hydrogen chloride is added. After 10 hours, the oil floating on the surface of the reaction mixture is separated and distilled under reduced pressure to recover unreacted naphthalene, and 1'-chloro-1-methyl-naphthalene. The normally solid 1-chloromethyl naphthalene boils at 153° C. under a pressure of 12 mm. mercury. It is purified by recrystallizing from alcohol.

Novolak naphthalene resin

A one liter flask was charged with 175 ml. monochlorobenzene, 120 grams (0.2 m.) 99° o-cresol novolak and 0.06 g. ZnCl₂ and heated to 120° C. Thereafter, 71 g. (0.4 m.) of monochloromethyl naphthalene was then added at this temperature over a period of two hours. Strong and immediate evolution of HCl took place upon the addition of the 1'-chloro-1-methyl naphthalene. After chloromethyl naphthalene addition had been completed, the mix was stirred for six hours at 125° C. and then cooled to 100° C. The reaction mass was filtered. Then the filtrate was distilled at a pressure of 7 mm. mercury and 200° C. oil bath temperature. There was thus obtained 172 g. of a light amber resin having a softening point of 133° C., a molecular weight of 838 and a hydroxyl content of 9.8%.

EXAMPLE II

To a flask equipped with a reflux condenser, a stirrer, and a thermometer was charged a mixture of 300 grams of an aqueous solution of formaldehyde (30% strength) and 200 grams of concentrated hydrochloric acid. Then, 90 grams of naphthalene was added. The mixture was heated to reflux and with stirring a current of gaseous hydrogen chloride was introduced for about 12 hours. After cooling, the reaction mass was separated from the mother liquor. The solid was filtered from the mother liquor, washed with water, and dried under a vacuum. The crude product was purified by recrystallization from acetone to yield a mixture of about equal parts of 1,4- and 1,5-di-(ω-chloromethyl)-naphthalene isomers.

There was dissolved 120 grams (0.2 mole) of 99° C. softening point (R. & B.) ortho-cresol novolak (made as in Example I) having a molecular weight of 605 and a hydroxyl content of 14.1% in 200 milliliters of monochlorobenzene by the warming of the solvent. Then the solution was cooled to 30° C., and 22.5 (0.1 mole) of di-(ω-chloromethyl)-naphthalene was added. Heat was applied and a complete solution resulted at about 60° C. As a catalyst, 0.04 gram of zinc chloride was added. The temperature of the solution was gradually raised; at about 100° C. evolution of hydrogen chloride commenced and refluxing started at about 130° C. The hydrogen chloride solution had stopped after six hours of refluxing. The trace amounts of colloidal solids that appeared to be present were filtered out and the filtrate was vacuum distilled to a temperature of 180° C. at 10 millimeters of mercury. The residue was a tan resin having a softening point of 152° C. (R. & B.), an average molecular weight of 1320 and 12% hydroxyl content.

The foregoing has described a novel novolak resin which has been modified by the addition thereto of large aromatic groups. The aromatic groups enhance aromatic character of the resin, i.e., the resistance to the common solvents and to water. The resin can be handled by conventional novolak procedures. For example, the resin can be cured with hexamethylene tetraamine. The cured resin has better thermal ablative characteristics than conventional novolaks because of the enhanced molecular weight and the inclusion of condensed hydrocarbon groups. The novel compound of this invention may have, for example, twice the molecular weight of the initial novolak resin.

I claim:
1. A naphthalene modified novolak resin having the structure:

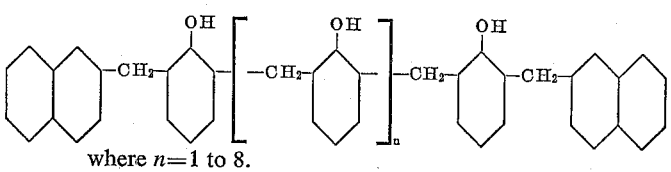

where $n=1$ to 8.

2. A naphthalene modified novolak resin having the structure:

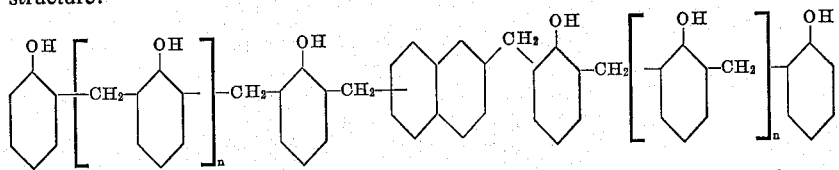

where $n = 1$ to 8.

3. The method of making a naphthalene modified novolak resin having methylene linkages between naphthalene and phenol groups and having substantially no ether linkages between naphthalene and phenol groups which comprises reacting a novolak resin with a chloromethyl naphthalene selected from the group consisting of 1-chloromethyl naphthalene and di-($\omega$-chloromethyl)-naphthalene at an elevated temperature in the presence of a Friedel-Crafts catalyst.

References Cited by the Examiner

UNITED STATES PATENTS

| | | | |
|---|---|---|---|
| 1,102,634 | 7/1914 | Aylsworth | 260—31.2 |
| 2,025,951 | 12/1935 | Kuzmick | 106—22 |
| 2,330,827 | 10/1943 | Kester | 260—43 |
| 2,954,360 | 9/1960 | Krzikalla et al. | 260—43 |

SAMUEL H. BLECH, *Primary Examiner.*

WILLIAM H. SHORT, *Examiner.*

H. SCHAIN, *Assistant Examiner.*